(12) United States Patent
Fukushima (10) Patent No.: US 7,407,236 B2
(45) Date of Patent: Aug. 5, 2008

(54) ELASTIC CRAWLER

(75) Inventor: Yasuharu Fukushima, Izumiohtsu (JP)

(73) Assignee: Sumitomo Rubber Industries, Ltd., Kobe-Shi (JP)

( * ) Notice: Subject to any disclaimer, the term of this patent is extended or adjusted under 35 U.S.C. 154(b) by 333 days.

(21) Appl. No.: 11/056,197

(22) Filed: Feb. 14, 2005

(65) Prior Publication Data

US 2005/0200200 A1    Sep. 15, 2005

(30) Foreign Application Priority Data

Mar. 9, 2004  (JP) .............................. 2004-065475

(51) Int. Cl.
    *B62D 55/24*    (2006.01)
    *F16G 1/04*    (2006.01)
(52) U.S. Cl. ...................... 305/171; 305/167
(58) Field of Classification Search ................ 305/165, 305/167, 170–177
    See application file for complete search history.

(56) References Cited

U.S. PATENT DOCUMENTS

| 1,400,100 | A | * | 12/1921 | Reddaway | ............... | 305/184 |
| 6,193,335 | B1 | * | 2/2001 | Edwards | ............... | 305/167 |
| 6,196,646 | B1 | * | 3/2001 | Edwards | ............... | 305/167 |
| 7,201,457 | B2 | * | 4/2007 | Katoh et al. | ............... | 305/194 |
| 2002/0070607 | A1 | * | 6/2002 | Edwards | ............... | 305/165 |
| 2004/0222697 | A1 | * | 11/2004 | Soucy et al. | ............... | 305/165 |

FOREIGN PATENT DOCUMENTS

| JP | 55-68479 | A | * | 5/1980 | ............... | 305/174 |
| JP | 62-43985 | U | | 3/1987 | | |
| JP | 3-108508 | U | | 11/1991 | | |
| JP | 4-13488 | U | | 2/1992 | | |
| JP | 7-8661 | B2 | | 2/1995 | | |
| JP | 7-277231 | A | | 10/1995 | | |
| JP | 2000-313371 | A | | 11/2000 | | |

* cited by examiner

*Primary Examiner*—Jason R Bellinger
(74) *Attorney, Agent, or Firm*—Birch, Stewart, Kolasch & Birch, LLP (57) ABSTRACT

An elastic crawler having a crawler main body including an endless belt of rubber-like elastic material that is driven by friction with a friction drive wheel. A plurality of guide projections protrude from the inner circumferential surfaces of both lateral edge portions of the crawler main body at specified intervals in the longitudinal direction of the belt. Guide core bodies are embedded to the inside of the respective guide projections in the lateral direction of the belt. A plurality of main body core bodies are embedded in the crawler main body in the same positions as the guide projections in the longitudinal direction of the belt, and a plurality of laterally extending lugs protrude from the outer circumferential surface of the crawler main body at specified intervals in the longitudinal direction of the belt. The guide core bodies and main body core bodies are independent of each other.

11 Claims, 6 Drawing Sheets

ELASTIC CRAWLER

FIELD OF THE INVENTION

The present invention relates to an elastic crawler which is mounted on various types of crawler units.

DESCRIPTION OF THE PRIOR ART

Conventionally, elastic crawlers have been widely used in various types of crawler units of agricultural machinery, construction machinery and the like. Drive systems used in such elastic crawlers include friction type drive systems and engagement type drive systems. Among these crawlers, elastic crawlers with a friction type drive system are crawlers in which friction drive wheels rotate while making contact with the inner circumferential surfaces of the elastic crawlers, thus producing a driving force by means of a frictional force.

For example, as is shown in FIG. 1 of Japanese Patent Publication No. H7-8661, such conventional elastic crawlers have a crawler main body which is driven by friction with the friction drive wheels, and a plurality of guide projections that protrude from the inner circumferential surfaces of both end portions of the abovementioned crawler main body in the lateral direction of the belt. The abovementioned crawler main body is constructed from an endless belt form rubber-like elastic material. Furthermore, the abovementioned plurality of guide projections are disposed at specified intervals in the longitudinal direction of the belt of the crawler main body. Moreover, guide core bodies which are embedded to the inside of the respective guide projections in the lateral direction of the belt, a plurality of main body core bodies which are embedded in the crawler main body in the same positions as the guide projections, and a plurality of lugs which protrude from the outer circumferential surface of the crawler main body at specified intervals in the longitudinal direction of the belt, are disposed in such elastic crawlers. Furthermore, the abovementioned plurality of lugs respectively extend in the lateral direction of the belt of the crawler main body.

However, in the abovementioned conventional elastic crawlers, the main body core body and guide core body are integrally constructed, and portion of the main body core body are embedded in the crawler main body. Accordingly, the freedom of movement of the guide projections is restricted, and the contact resistance with the friction drive wheels is increased. In other words, there has been a problem that the side surfaces of the friction drive wheels are susceptible to wear.

Meanwhile, it is conceivable that the guide core body might be omitted in order to eliminate such a problem. In such a case, however, the rigidity of the guide projection is reduced to cause a problem that the elastic crawler tends to slip off of the friction drive wheels.

OBJECT AND SUMMARY OF THE INVENTION

The present invention was devised in light of the abovementioned problems and it is an object of the present invention to provide an elastic crawler which can suppress wear on the side surfaces of the friction drive wheels while reducing the possibility that the crawler will slip off of the friction drive wheels.

The elastic crawler of the present invention in order for achieving the abovementioned object comprises a crawler main body consisting of an endless belt form rubber-like elastic material which is driven by means of friction with a friction driving wheel, a plurality of guide projections which are formed to protrude from the inner circumferential surfaces of both end portions of the abovementioned crawler main body in the lateral direction of the belt at specified intervals in the longitudinal direction of the belt, guide core bodies which are embedded to the inside of the abovementioned respective guide projections in the lateral direction of the belt, a plurality of main body core bodies which are independent of the abovementioned guide core bodies, respectively and which are embedded in the abovementioned crawler main body in the same positions as the abovementioned guide projections in the longitudinal direction of the belt, and a plurality of lugs which are formed to protrude from the outer circumferential surface of the abovementioned crawler main body at specified intervals in the longitudinal direction of the belt, and which are respectively extended in the lateral direction of the belt.

In the elastic crawler of the present invention, the guide core body and main body core body are independent of each other; accordingly, the guide core body is not constrained by the main body core body during the rotation of the elastic crawler. Consequently, the degree of freedom of movement of the guide projection is increased, and the contact resistance between the guide projections and the friction drive wheels does not become excessive, so that wear on the side surfaces of the friction drive wheels is prevented. Meanwhile, the guide core body itself is embedded in the guide projection, there is no drop in the rigidity of the guide projection compared to a case in which guide core bodies are not embedded. As a result, the possibility that the elastic crawler will slip off of the friction drive wheels can be reduced. Specifically, wear on the side surfaces of the friction drive wheels can be suppressed while reducing the possibility that the elastic crawler will slip off of the friction drive wheels.

DESCRIPTION OF THE PREFERRED EMBODIMENT

Embodiments of the present invention will be described below with reference to the attached figures.

Figure 1:
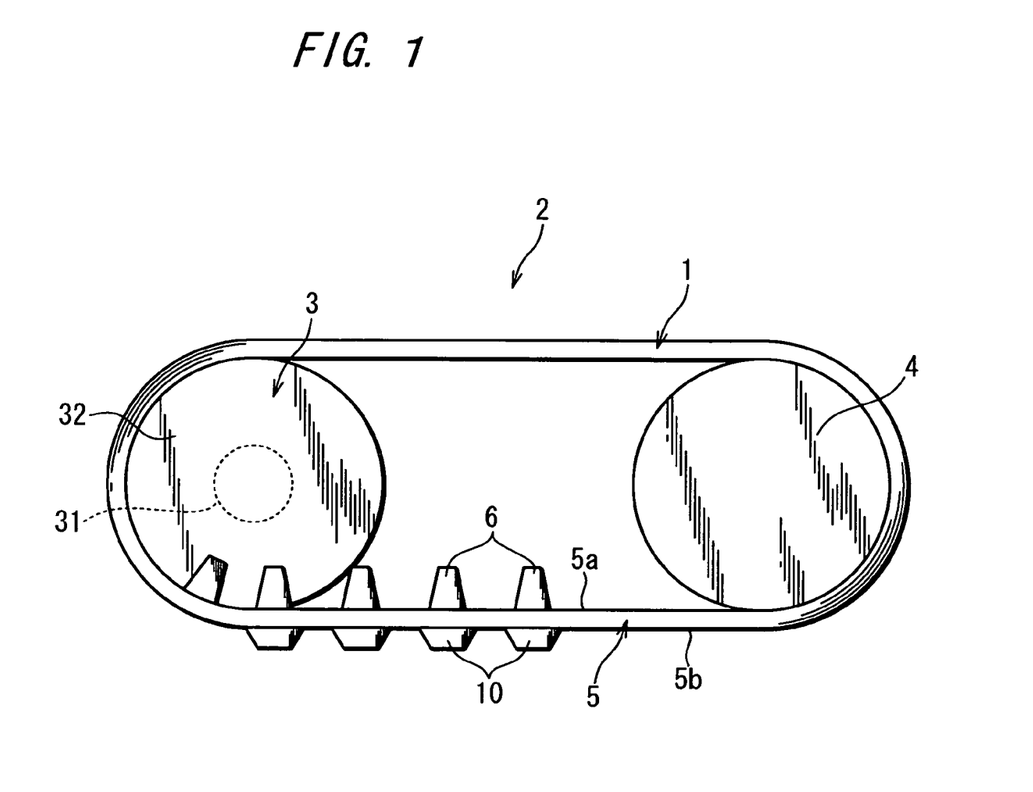
FIG. 1 is a schematic side view showing a crawler unit on which the elastic crawler of the present invention is mounted.

FIG. 1 shows crawler unit 2 on which an elastic crawler 1 related to an embodiment of the present invention is mounted. Furthermore, a portion of the elastic crawler 1 is omitted from the figure. As is shown in FIG. 1, this crawler unit 2 is used in agricultural machinery, construction machinery or the like, and has at least friction drive wheels 3 that generate a driving force, and coupled driving wheels 4 that are installed so that these wheels rotate freely. Respective elastic crawlers 1 are mounted on the outer circumferential surfaces of these friction drive wheels 3 and coupled driving wheels 4.

Figure 2:
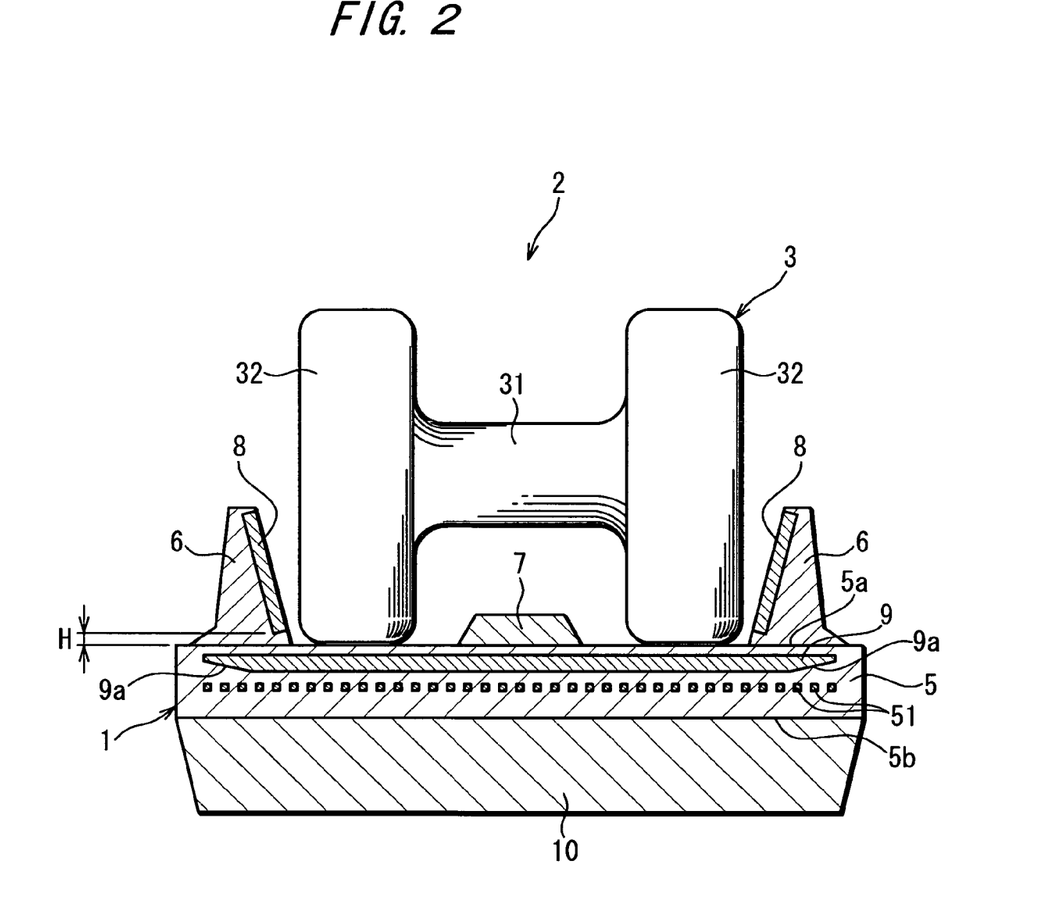
FIG. 2 is a cross-sectional view showing the elastic crawler of the present invention.

FIG. 2 shows the relationship between the friction drive wheels 3 and elastic crawlers 1.

As is shown in FIG. 2, each elastic crawler 1 has a crawler main body 5 consisting of (made from) an endless belt of rubber-like elastic material which is driven by friction with the corresponding friction driving wheel 3, a plurality of guide projections 6 which are formed to protrude from the inner circumferential surface 5a on both end, or edge, portions of the crawler main body 5 in the lateral direction of the belt at specified intervals in the longitudinal direction of the belt, and a plurality of auxiliary projections 7 which are formed to protrude from the inner circumferential surface 5a on the central portion of the crawler main body 5 in the lateral direction of the belt.

Furthermore, the elastic crawler 1 comprises guide core bodies 8 which are embedded to the inside of the respective guide projections 6 in the lateral direction of the belt, a plurality of main body core bodies 9 which are embedded in the crawler main body 5 in the same positions as the guide projections 6 in the longitudinal direction of the belt, and a plurality of lugs 10 which are formed to protrude from the outer circumferential surface 5b of the crawler main body 5 at specified intervals in the longitudinal direction of the belt, and which extend in the lateral direction of the belt. Moreover, the guide core body 8 and main body core body 9 are independent of each other, and the guide core body 8 is disposed in positions that are separated from the main body core body 9 to the inside in the direction of thickness of the belt, i.e., in a direction from the outer circumferential surface to the inner circumferential surface of the crawler main body 5. In more concrete terms, the abovementioned guide core body 8 is disposed so that the shortest distance H between the end portion of the guide core body 8 to the outside in the direction of thickness of the belt and the inner circumferential surface 5a of the crawler main body 5 is 5 mm or greater.

Each friction driving wheel 3 has a rotationally driven rotating shaft 31, and a pair of disk-form wheels 32 which are disposed on both end portions of this rotating shaft 31 in the axial direction. The pair of wheels 32 are respectively disposed between the guide projection 6 and auxiliary projection 7 in the lateral direction of the belt, and the outer circumferential surfaces of the respective wheels 32 contact the inner circumferential surface 5a of the crawler main body 5. Furthermore, the rotation of the friction driving wheel 3 is transmitted to the elastic crawler 1 by the frictional resistance that accompanies the abovementioned contact, so that this elastic crawler 1 rotates.

Tension body 51 consisting of steel cords or the like is embedded in the crawler main body 5 to the outside of the main body core bodies 9 in the direction of thickness of the belt. This tension body 51 forms an endless circuit in the interior of the abovementioned crawler main body 5. The guide projections 6 are disposed so as to clamp the pair of wheels 32 from both sides in the lateral direction of the belt, so that the rolling path of the pair of wheels 32 is restricted from both sides in the lateral direction of the belt. In other words, the possibility that the elastic crawler 1 will slip off of the friction driving wheel 3 can be reduced by these guide projections 6.

Each of the auxiliary projections 7 are formed with a substantially trapezoidal cross-sectional shape, and are disposed on the inner circumferential surface 5a of the crawler main body 5 at the same pitch as the guide projections 6 in positions that correspond to the guide projections 6 in the longitudinal direction of the belt. Furthermore, these auxiliary projections 7 restrict the rolling path of the pair of wheels 32 from the inside in the lateral direction of the belt.

Each of the lugs 10 are formed with a substantially trapezoidal cross-sectional shape, and are formed on a substantially straight line that extends in the lateral direction of the belt of the crawler main body 5. The lugs are disposed on the outer circumferential surface 5b of the crawler main body 5 at the same pitch as the guide projections 6 in positions that correspond to the guide projections 6 in the longitudinal direction of the belt.

The main body core body 9 consists of a metal, resin or the like, and is formed with, for example, a substantially rectangular cross-sectional shape; this main body core body 9 is formed on a substantially straight line that extends in the lateral direction of the belt of the crawler main body 5. Furthermore, tapered portions 9a in which both end portions in the lateral direction of the belt and the outsides in the direction of thickness of the belt are inclined toward the inside in the direction of thickness of the belt are formed on this main body core body 9. That is, lateral edges of the main core body 9 have tapered portions 9a with a surface, located toward the outside in the thickness direction of the belt, that inclines toward the outside laterally and toward the inside in the direction of thickness of the belt.

Figure 3:
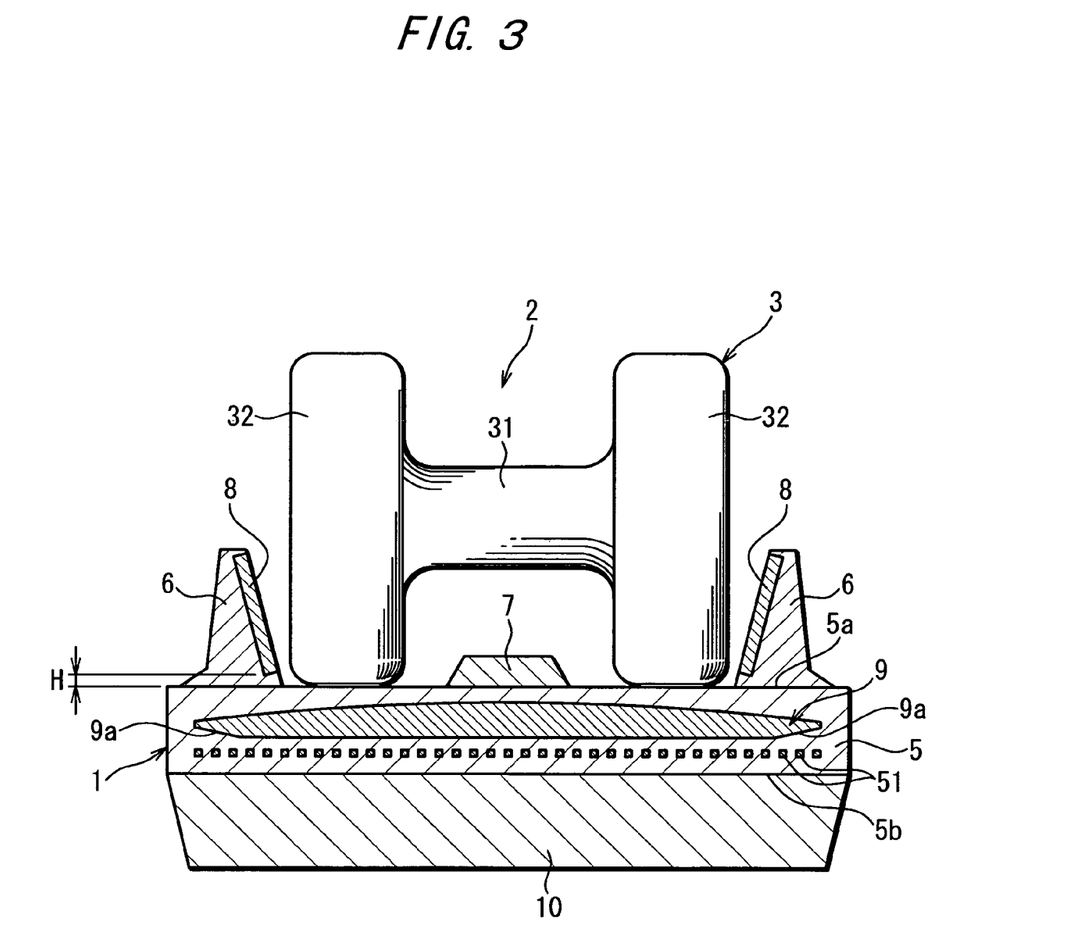
FIG. 3 is a cross-sectional view of an elastic crawler showing a first modification of the main body core bodies.
Figure 4:
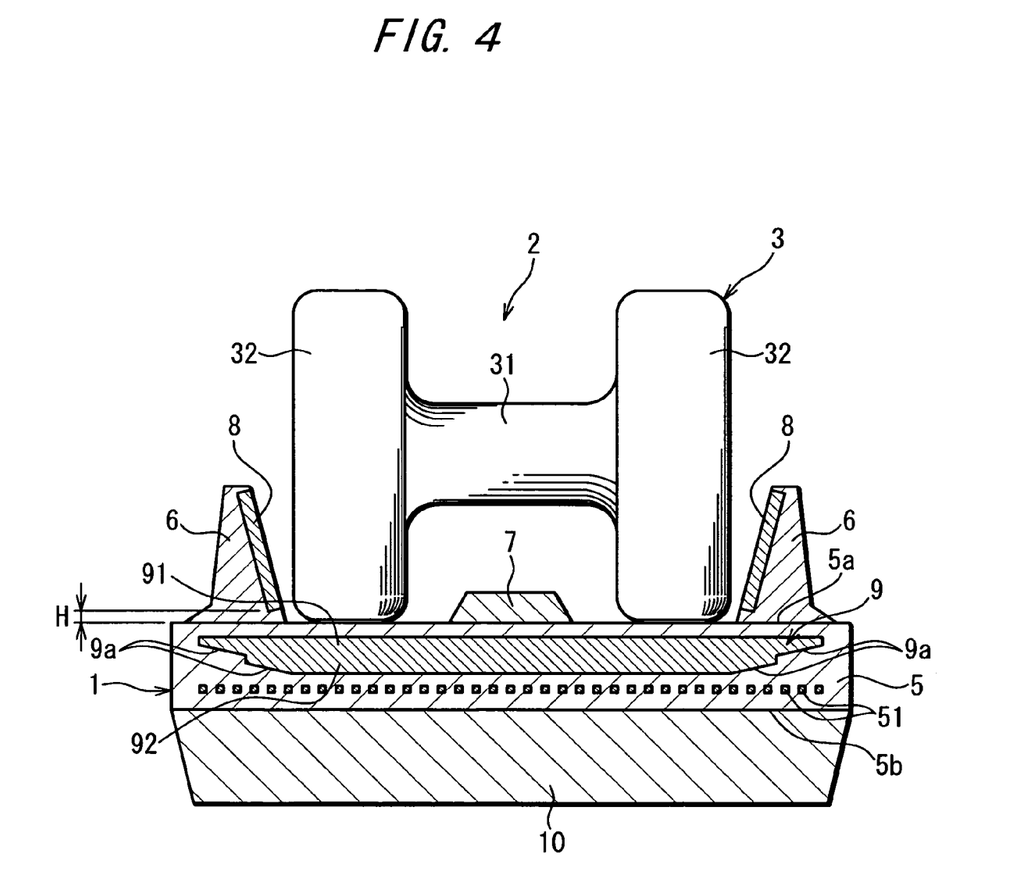
FIG. 4 is a cross-sectional view of an elastic crawler showing a second modification of the main body core bodies.

FIGS. 3 and 4 show a first modification and a second modification of the main body core bodies 9.

As is shown in FIG. 3, the main body core body 9 may also be formed with a substantially semicircular cross-sectional shape. In this case as well, tapered portions 9a which are used to avoid the concentration of stress are formed on both end portions of the main body core body 9 in the lateral direction of the belt and on the side of the outer circumferential surface 5b in the direction of thickness of the belt so that these portions are inclined toward the inner circumferential surface 5a in the direction of thickness of the belt. Furthermore, as is shown in FIG. 4, the main body core body 9 may also be integrally formed with a substantially T-shape cross-sectional shape from a base 91 with a substantially rectangular cross-sectional shape and a projecting portion 92 that is caused to extend from the central portion of the base 91 in the lateral direction of the belt toward the outer circumferential surface 5b in the direction of thickness of the belt. In this case as well, tapered portions 9a are respectively formed on both end portions of the base 91 and the projecting portion 92 in the lateral direction of the belt and on the outsides in the direction of thickness of the belt so that these tapered portions are inclined toward the inside in the direction of thickness of the belt.

Figure 5:
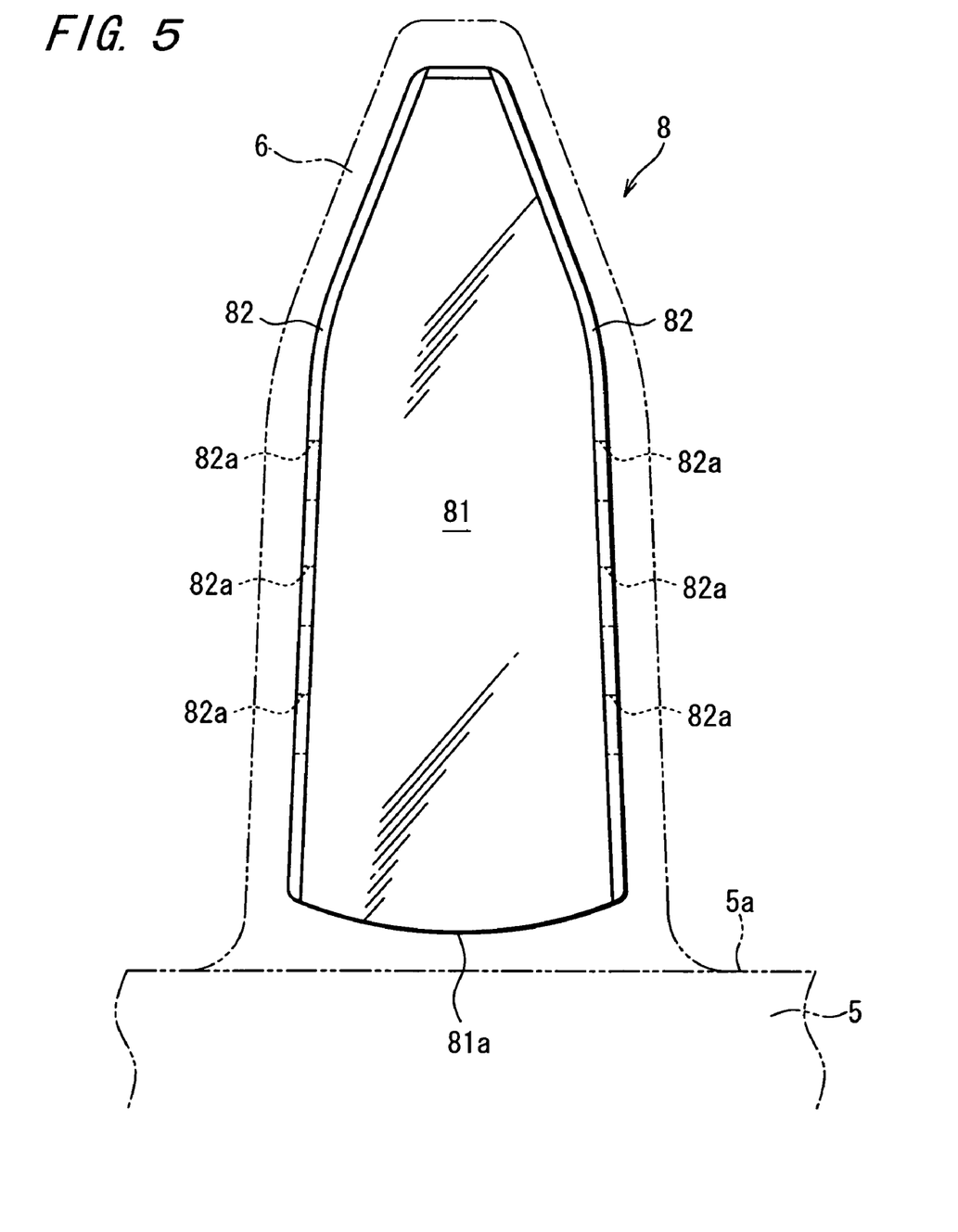
FIG. 5 is a front view of one of the guide core bodies.
Figure 6:
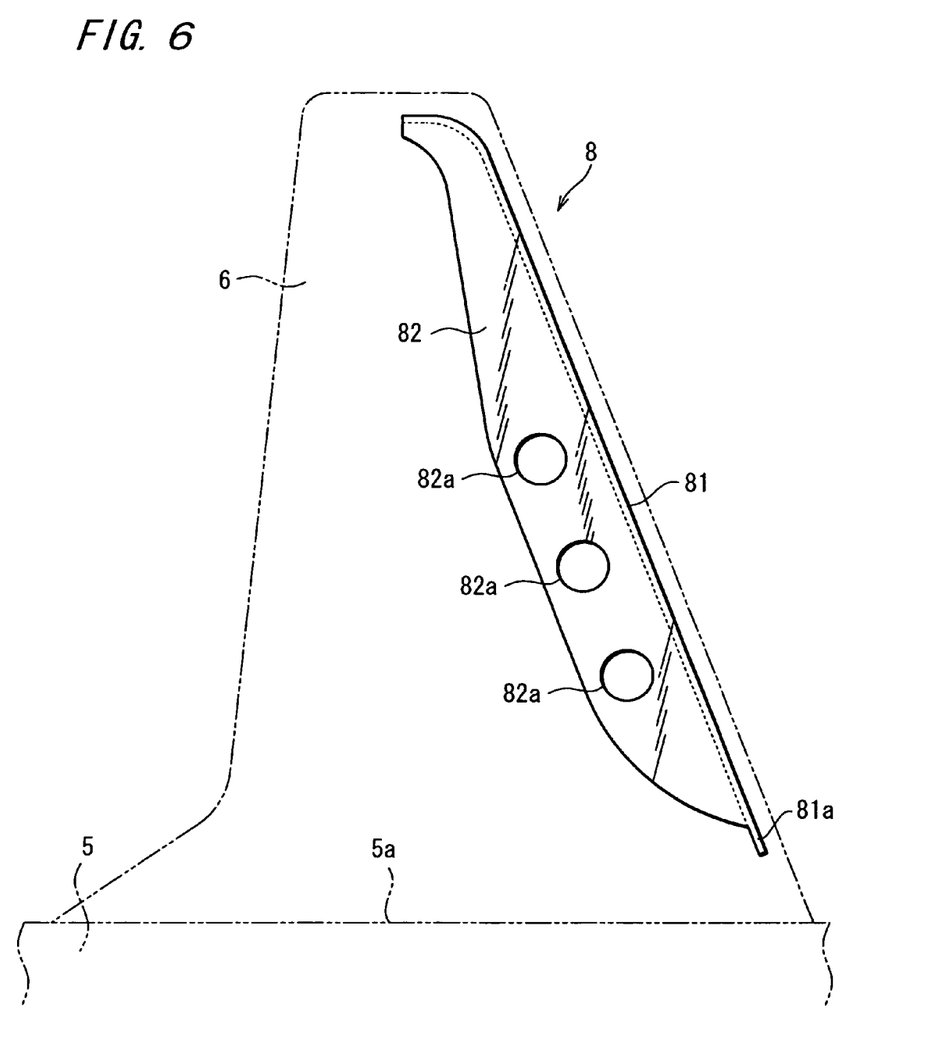
FIG. 6 is a side view of one of the guide core bodies.

FIG. 5 shows a front view of one of the guide core bodies 8, and FIG. 6 shows a side view of the same. Furthermore, the left-right direction in FIG. 5 is the longitudinal direction of the belt, and the left-right direction in FIG. 6 is the lateral direction of the belt.

As is shown in FIGS. 5 and 6, the guide core body 8 consists of a metal, resin or the like, and have a core body main body 81 which conforms to the side surface shape on the inside of the corresponding guide projection 6 in the lateral direction of the belt, and extension portions 82 which extend toward the outside in the lateral direction of the belt from both end portions of the core body main body 81 in the longitudinal direction of the belt. Furthermore, a plurality of through-holes 82a are formed in the extension portions 82 as adhesion strengthening portion that increase the adhesive strength between the extension portions 82 and the rubber-like elastic material that constitutes the guide projections 6. Moreover, the edge portion 81a of the guide core body 8 on the outside in the direction of thickness of the belt are formed so that this edge portion has a protruding shape that protrudes toward the outside in this same direction of thickness. Specifically, the edge portion 81a is shaped to have a curved outline expanding toward the outside of the belt in the thickness direction thereof. Furthermore, through-holes 82a may be formed in the core body main body 81 as well as in the extension portions 82, or may be formed only in the core body main body 81. Moreover, indentations and projections such as surface texturing or the like may be formed instead of through-holes 82a; as long as the strength of the adhesion to the rubber-like elastic material can be increased, the present invention is not limited to the abovementioned configuration.

In the elastic crawler 1 constructed as described above, since the guide core body 8 and main body core body 9 are independent of each other, the guide core body 8 is not constrained by the main body core body 9 during the rotation of the elastic crawler 1. Accordingly, the degree of freedom of movement of the guide core body 8 is improved. Specifically, since the contact resistance between the guide projections 6 and the friction drive wheels 3 can be reduced during the rotation of the elastic crawler 1, wear of the side surfaces of the friction drive wheels 3 can be suppressed. Furthermore, since the guide core body 8 itself is left in the guide projection 6, there is no drop in the rigidity of the guide projection 6 compared to a case in which there is no such core body 8, and the possibility that the elastic crawler 1 will slip off of the friction drive wheels 3 can therefore be reduced. Furthermore, the rubber-like elastic material that constitutes the guide projections 6 can be pressed from the lateral direction of the belt during the molding of the elastic crawler 1, so that this material can be prevented from moving around to the inside of the guide core body 8 in the lateral direction of the belt. Accordingly, compared to conventional cases in which the guide core body 8 and main body core body 9 are constructed from integrated members, the labor required in order to remove such invading rubber-like elastic material can be reduced.

Furthermore, since the guide core body 8 is disposed in position that is separated from the main body core body 9 to the inside in the direction of thickness of the belt, a sufficient amount of the rubber-like elastic material enters the spaces between the guide core body 8 and main body core body 9 in the direction of thickness of the belt. As a result, the freedom of movement of the guide projection 6 can be sufficiently ensured. Accordingly, the generation of cracks in the root portion of the guide projection 6 during the rotation of the elastic crawler 1 can be prevented. Furthermore, since the edge portion 81a of the guide core body 8 on the outside in the direction of thickness of the belt is formed so that this portion has a protruding shape toward the outside in this same direction of thickness, the stress that is generated in the boundary areas between the edge portion 81a of the guide core body 8 and the surrounding rubber-like elastic material during the rotation of the elastic crawler 1 can be dispersed. Accordingly, the generation of cracks in the root portion of the guide projection 6 can be prevented.

Furthermore, since through-holes 82a are formed in the extension portions 82 of the guide core body 8, the rubber-like elastic material that constitutes the guide projection 6 enters the through-holes 82a during the molding of the elastic crawler 1, so that the adhesive strength between the guide core body 8 and rubber-like elastic material is increased. Accordingly, the adhesion of the guide core body 8 and guide projection 6 can be improved. Moreover, since tapered portions 9a that are inclined toward the inside in the direction of thickness of the belt are formed on the main body core body 8 on both end portions in the lateral direction of the belt and on the outsides in the direction of thickness of the belt, the stress that is generated in the boundary areas between the main body core body 8 and the rubber-like elastic material during the rotation of the elastic crawler 1 can be dispersed. Accordingly, the peeling of the rubber-like elastic material from the main body core body 8 inside the crawler main body 5 can be prevented, and the generation of cracks in both end portions of the crawler main body 5 in the lateral direction of the belt can be prevented.

The invention claimed is:

1. An elastic crawler comprising:
a crawler main body consisting of an endless belt of elastic material that is driven by friction with a friction drive wheel, the crawler main body having (1) laterally spaced edge portions, (2) an outer circumferential surface and (3) an inner circumferential surface spaced from the outer circumferential surface in a direction of thickness of the belt;
a plurality of guide projections which protrude from the inner circumferential surface of both lateral edge portions of said crawler main body at specified intervals in a longitudinal direction of the belt;
a guide core body embedded in a laterally inside surface of each of said guide projections;
a plurality of main body core bodies which are (1) independent of said guide core bodies and (2) embedded in said crawler main body in positions corresponding with said guide projections in the longitudinal direction of the belt; and
a plurality of laterally extending lugs which protrude from the outer circumferential surface of said crawler main body at specified intervals in the longitudinal direction of the belt.

2. The elastic crawler according to claim 1, wherein said guide core bodies are disposed in positions that are separated from said main body core body in the direction of thickness of the belt.

3. The elastic crawler according to claim 1, wherein an edge portion of each guide core body adjacent to a main core body has a protruding shape that protrudes toward the outside in the direction of thickness of the belt.

4. The elastic crawler according to claim 2, wherein an edge portion of each guide core body adjacent to a main core body has a protruding shape that protrudes toward the outside in the direction of thickness of the belt.

5. The elastic crawler according to claim 1, wherein
said guide core body has (1) a core body main body that conforms to the shape of the laterally inside surface of the corresponding guide projection and (2) extension portions that extend laterally to the outside from end portions of said core body main body that are spaced from each other in the longitudinal direction of the belt, and
an adhesion strengthening portion that increases the adhesive strength with the rubber-like elastic material that constitutes said guide projection is formed in at least one of the core body main body and the extension portions.

6. The elastic crawler according to claim 2, wherein
said guide core body has (1) a core body main body that conforms to the shape of the laterally inside surface of the corresponding guide projection and (2) extension portions that extend laterally to the outside from end portions of said core body main body that are spaced from each other in the longitudinal direction of the belt, and
an adhesion strengthening portion that increases the adhesive strength with the rubber-like elastic material that constitutes said guide projection is formed in at least one of the core body main body and the extension portions.

7. The elastic crawler according to claim 3, wherein
said guide core body has (1) a core body main body that conforms to the shape of the laterally inside surface of the corresponding guide projection and (2) extension portions that extend laterally to the outside from end portions of said core body main body that are spaced from each other in the longitudinal direction of the belt, and an adhesion strengthening portion that increases the adhesive strength with the rubber-like elastic material that constitutes said guide projection is formed in at least one of the core body main body and the extension portions.

8. The elastic crawler according to claim 1, wherein lateral edges of said main core bodies have tapered portions with a surface that inclines toward the outside laterally and toward the inside in the direction of thickness of the belt.

9. The elastic crawler according to claim 2, wherein lateral edges of said main core bodies have tapered portions with a surface that inclines toward the outside laterally and toward the inside in the direction of thickness of the belt.

10. The elastic crawler according to claim 3, wherein lateral edges of said main core bodies have tapered portions with a surface that inclines toward the outside laterally and toward the inside in the direction of thickness of the belt.

11. The elastic crawler according to claim 4, wherein lateral edges of said main core bodies have tapered portions with a surface that inclines toward the outside laterally and toward the inside in the direction of thickness of the belt.

* * * * *